Patented Dec. 29, 1936

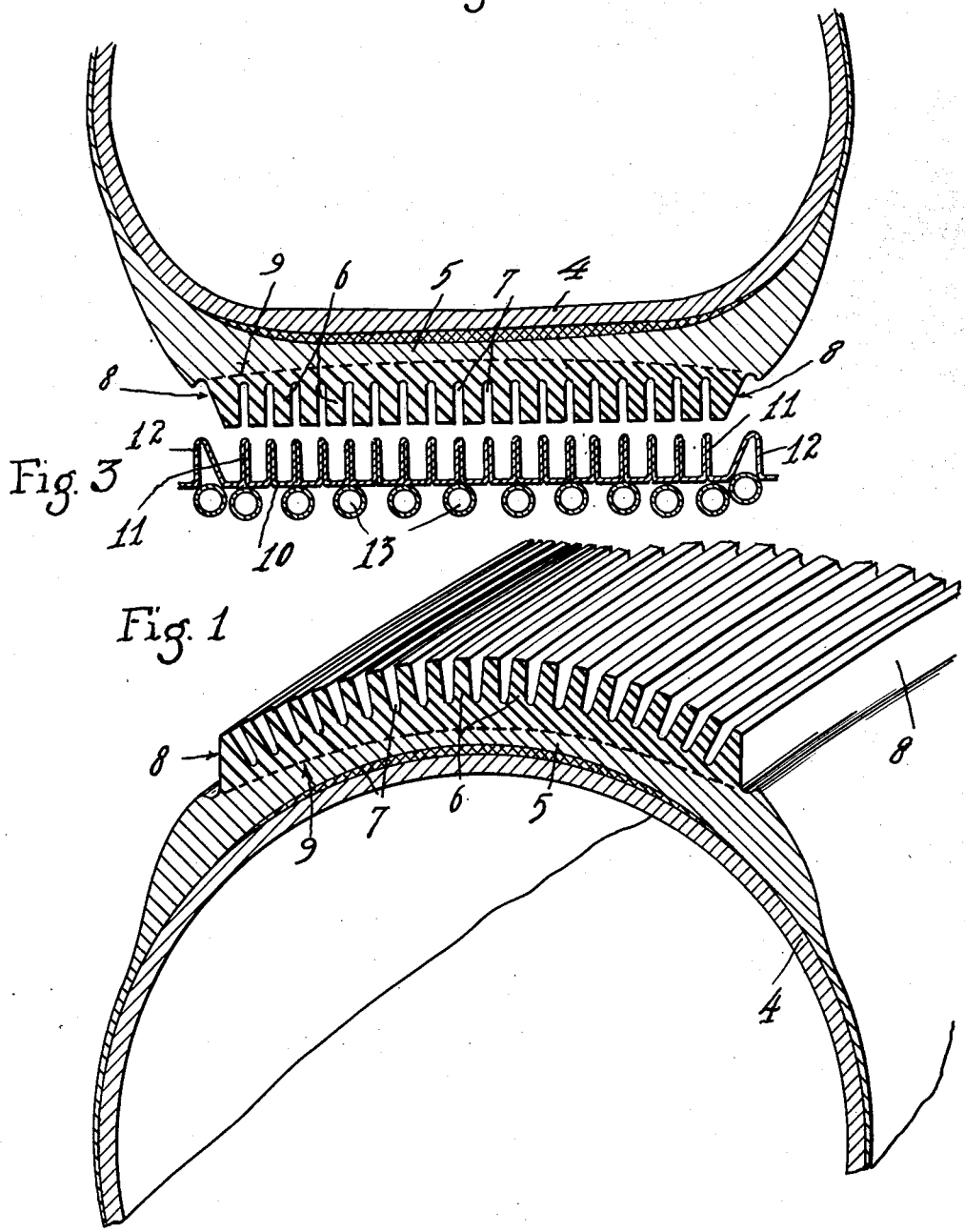

2,065,696

UNITED STATES PATENT OFFICE 2,065,696

TIRE TREAD

Paul E. Hawkinson, Minneapolis, Minn.

Application February 20, 1936, Serial No. 64,907

3 Claims. (Cl. 152—14)

My present invention relates generally to the tread portions of pneumatic tires, but more particularly to the retreads for such tires, and provides certain important improvements in the construction and operation thereof.

It has been found in actual practice that with the shallow channels and relatively wide ribs usually employed, and with the tread or retread applied and vulcanized to the tire casing under normal tension, while the latter is in normal condition, and at full diameter, there will, when the tread is flattened by contact with the road under load, be a flow of tread rubber ahead of the advancing tread which produces a sort of a buckling of the rubber that not only causes excessive and uneven wear but resists the advance movement of the tire with a resulting loss in power, much as if the tire were caused to climb an elevation while running on a level road.

I have further found that highly important improvement in tire tread can be produced by providing the same with circumferentially extended ribs and intervening channels, in which the ribs are deeper than they are wide, in which the ribs are deeper than the channels are wide, and in which the ribs are wider than the channels.

As an important fact I have found that with the ribs and channels formed in the improved manner just above specified, the objectionable noted flowing of the rubber ahead of the tread will be avoided or greatly reduced, and the tendency to produce such advance flow of the rubber will be neutralized or absorbed by a lateral buckling or lateral swerving of the ribs themselves as the tread is flattened and the ribs compressed by the road contact.

This buckling or lateral swerving of the ribs, while it in whole or in part prevents the objectionable forward flow of the rubber of the tread, is however, only a partial cure of a defect, inasmuch as even the buckling of the ribs, which tends more or less to close the channels, is not in itself desirable. I have further found that this latter noted action can be avoided by applying and vulcanizing the tread rubber to the tire casing while the latter is circumferentially contracted. This latter noted feature of applying and vulcanizing the rubber to the tire casing, while it is contracted, and which may be designated as applying the rubber "short", is a feature disclosed and broadly claimed in my prior patents Nos. 1,917,261 and 1,917,262 of date July 11, 1933. As disclosed in said prior patents, the tire casing can be circumferentially contracted by spreading the casing laterally; and the application of the rubber "short" under normal tension may be accomplished by applying and vulcanizing under normal tension while the casing is thus contracted and laterally spread.

When this latter noted feature of applying and vulcanizing the tread rubber "short" is carried out in connection with the ribs and channels, formed as above described, I have found that when the tire tread is flattened by road contact, the ribs, which in the normal condition of the tire casing is stretched, will simply contract to or approximately to their normal condition and there will be but little or no buckling or lateral swerving of the ribs, and little or no tendency to close the channels of the flattende road contacting portion of the tread. This arrangement furthermore gives the maximum amount of rubber road contact, a minimum of wear of rubber, and a maximum frictional contact and traction on the road.

In the accompanying drawing, wherein like characters indicate like parts throughout the several views, I have illustrated a commercial form of a tire tread constructed and applied in accordance with my present invention.

Referring to the drawing:

Fig. 1 is a fragmentary perspective showing a tire casing with the improved tread, in the form of a retread, applied thereto;

Fig. 2 is a transverse section, with some parts broken away, showing the ground-engaging tread portion of the tire as it appears when pressed flat upon the road; and Fig. 3 is a transverse section showing a mold for forming the retread.

The tire casing proper is indicated by the numeral 4 and the tread rubber by the numeral 5. This tread rubber 5 is formed with circumferentially extended ribs 6 and intervening channels 7. Also, the tread rubber is formed on its sides with marginal ribs 8 that project well outward of the shoulders of tire casing. The ribs 6 and intervening channels 7 have the relative dimensions above described, that is, the ribs 6 are deeper than they are wide, the channels 7 are deeper than they are wide, the ribs 6 are deeper than the channels 7 are wide, and said ribs are wider than said channels. The line on which the tread rubber 5 is applied to the tire casing is indicated at 9 but it will, of course, be understood that the tread rubber and the tire casing, under the operation of vulcanizing the tread rubber, will be substantially integral.

In Fig. 3 a mold of annular form is indicated by the numeral 10 and its ribs are indicated by the numerals 11 and 12. In Fig. 3 heating coils 13, which form no part of the present invention, are indicated as applied around the mold.

In the improved and preferred process of applying and forming the tread, the tire casing will be laterally expanded so that its tread portion will be substantially flat transversely and which operation contracts the casing circumferentially and materially decreases both the circumferential dimension and diameter thereof. The tread rubber is, of course, applied to the tire casing in soft or unvulcanized condition and while the casing is circumferentially contracted, and this soft tread rubber, under normal stress or condition, will be of just sufficient length to reach around the contracted casing. Then the annular mold will be applied around the applied tread rubber of the casing and by outward pressure the tread rubber will be forced into the mold, thereby giving the same the form illustrated. When the mold is thus applied heat will be applied to the mold to vulcanize the tread rubber onto the tire casing while the casing is still in circumferential contracted form. The tread rubber is, therefore, applied and vulcanized "short", that is, of a normal length less than the external circumference of the casing when the latter is permitted to expand to normal or inflated condition. Hence, when the casing is allowed to expand the tread rubber, including its ribs, will be stretched to adapt itself to the normal dimensions of the tire casing.

When the tire is flattened against the road it will be, at the place of road contact, flattened and returned to or substantially to the same condition or shape that it was given by the mold, and hence, the ribs and body of the retread rubber will contract to a condition under which they are free or substantially free from stretching tension, but will not be caused to buckle or swerve sideways. It will be understood that the buckling or swerving and tendency of the retread rubber to flow ahead of the advancing tire, would not take place or tend to take place unless the tread rubber be pressed beyond its normal tendency to contract, which is an action that is avoided when the tread rubber is applied and cured "short", as above described. Stated in another way, the curing radius of the rubber tread is the same or substantially the same as the road or running radius of the tire. In this improved tire tread or retread, as preferably carried out, the rubber of the tread or retread, in the normal condition of the tire, will be stretched and under tension, so that under load, the road-contacting portion of the rubber tread will contract circumferentially to or toward neutral tension.

When tires are cured in the old way and formed with closely positioned ribs and narrow intervening grooves, it has been found that when the tire was flattened, under load at the ground-engaging portion, the ribs would tend to come together and close the grooves. With the tire tread cured, in accordance with my invention, to wit: while the tire was contracted circumferentially and flattened transversely, the grooves, when the tire is inflated and free from pressure, have diverging walls, and when pressed on the road, the ribs will assume substantially the same conditions that they had when cured and the grooves will not be closed, but will themselves assume also substantially the same form as when molded and cured. When the tread, constructed in accordance with this invention, is in contact with the ground, snow or the like may get into the grooves, but as the tire tread moves from the ground, the grooves will diverge so that the snow or material caught will be discharged by centrifugal force.

What I claim is:

1. A tire having an elastic tread formed with ribs and intervening channels, said ribs being deeper than they are wide, the channels being deeper than they are wide, the ribs being deeper than the channels are wide, and the ribs being wider than said channels, said elastic tread, in the normal condition of the tire, being stretched and under tension, so that under load, the road-contacting portion of said tread will contract circumferentially to or toward neutral tension.

2. A tire having an elastic rubber tread formed with ribs and intervening channels, said ribs being deeper than they are wide, the channels being deeper than they are wide, the ribs being deeper than the channels are wide, and the ribs being wider than said channels, the rubber of said tread, in the normal condition of the tire, being stretched and under tension, so that under load, the road-contacting portion of the rubber of said tread will be contracted circumferentially to or toward neutral tension.

3. A tire having an elastic tread formed with ribs and intervening channels, said ribs being deeper than they are wide, the ribs being deeper than the channels are wide, and the ribs being wider than said channels, said elastic tread, in the normal condition of the tire, being stretched and under tension, so that under load, the road-contacting portion of said tread will contract circumferentially to or toward neutral tension, said rubber tread being vulcanized to the tire proper and said channels and ribs being entirely within the applied tread and the ribs being an integral part of the latter.

PAUL E. HAWKINSON.